United States Patent [19]
Melville

[11] Patent Number: 5,461,793
[45] Date of Patent: Oct. 31, 1995

[54] SELF CENTERING PIPE AXIS LASER GUIDE

[76] Inventor: Kenneth B. Melville, 9507 50th Pl., College Park, Md. 20740

[21] Appl. No.: 319,928

[22] Filed: Oct. 7, 1994

Related U.S. Application Data

[63] Continuation-in-part of Ser. No. 41,038, Mar. 31, 1993, Pat. No. 5,359,781.
[51] Int. Cl.[6] .................................................. G01B 11/27
[52] U.S. Cl. .................. 33/286; 33/520; 33/529; 33/645; 33/DIG. 21; 356/153
[58] Field of Search ............. 33/286, 299, DIG. 21, 33/520, 529, 544.2, 544.6, 302, 644, 645, 542; 356/138, 153

[56] References Cited

U.S. PATENT DOCUMENTS

| | | |
|---|---|---|
| 2,323,039 | 6/1943 | Hill . |
| 2,541,641 | 2/1951 | Dodson .................................. 33/373 |
| 3,631,601 | 1/1972 | McNulty . |
| 3,707,722 | 1/1973 | Cotter ..................................... 33/373 |
| 3,742,581 | 7/1973 | Roodvoeis . |
| 4,053,238 | 10/1977 | George et al. ....................... 356/138 X |
| 4,155,648 | 5/1979 | Ferguson ............................... 33/299 X |
| 4,357,660 | 11/1982 | Happ ...................................... 33/302 X |
| 4,521,968 | 6/1985 | Wiltermood et al. ................. 33/286 X |
| 4,711,037 | 12/1987 | Saadat ..................................... 33/520 |

*Primary Examiner*—Alvin Wirthlin
*Attorney, Agent, or Firm*—Robert Halper

[57] ABSTRACT

An improved self centering guide pipe axis laser guide is based on the use of three parallel links spaced 120 degrees apart which are engaged to be expanded or contracted. When expanded the links contact the inside diameter of the pipe which accordingly establishes the center axis of the pipe. The links are actuated for expansion or contraction by mounting a spring base spider element in association with a spider lever element on a smooth pipe housing, wherein the movement of the spring base spider element and the spider lever element is controlled by thumbscrews on each of the elements, the smooth pipe housing containing within, the power supply and laser module, and a removable switch assembly at the rear enabling easy access to the batteries. The laser guide can readily be withdrawn from the pipe by attaching a tether line to the front end and levels for determining the slope are mounted in slots in both the front and rear spider elements. The axis laser guide can also be cradled on top of the pipe for making alignment measurements when access to the interior of the pipe is obstructed.

8 Claims, 11 Drawing Sheets

SELF CENTERING PIPE AXIS LASER GUIDE

This application is a continuation in part of application Ser. No. 08/041/038 filed on Mar. 31, 1993, now U.S. Pat. No. 5,359,781.

FIELD OF INVENTION

This invention has to do with the location of a pipe axis, the projection of a laser beam on this axis for alignment purposes and the monitoring of the inclination of this axis as for example in the installation of piping systems or the alignment of pillow blocks for motor shaft bearings.

BACKGROUND OF THE INVENTION

In recent years the use of a laser beam for pipe installation has become quite prevalent. Most of the devices extant are used for larger pipe, that is, greater than six inch pipe diameter. Moreover, many of the devices, while providing means for positioning the laser beam to a specific grade and elevation do not necessarily establish the beam at the axis of the pipe. To establish the coincidence of the axis of the beam and the pipe, the general procedure is to shift the pipe to a position that is adjudged by the eye to be in alignment with the center. Obviously such trial and error procedure is not very accurate. U.S. Pat. No. 4,916,817 is an example of prior art which has a solution for the problem. The essence of this invention is to use what is referred to as a laser target anchored at one end of the pipe. In general a laser will be started at one end of a pipe and will emit a beam that travels through the pipe and strikes a target plate formed of a dielectric sufficiently translucent to allow the point at which the beam strikes the plate to be visible from the opposite end. The plate is provided with a series of cross hatch marks which indicate the center of the target and the pipe is adjusted until the beam strikes the laser target's center. There is also a level on the target plate that assists in identifying alignment errors. Note also other examples of diverse laser target systems for pipes cited in column 1 of this patent. Another type of prior art for laying pipe, U.S. Pat. No. 3,742,581 makes use of two projected planes of light through the pipe so that each plane is either coplanar or parallel to the selected axis. There are also a number of patents that utilize mechanical self centering devices such as U.S. Pat. Nos. 1,448,528, 2,447,932, 3,822,478, 4,069,688 and 4,773,164. Besides being structurally distinct from the present invention, none is concerned with the use of laser beams. U.S. Pat. No. 2,323,039 does bear a structural resemblance to the present invention, although this patent refers to his device as a clamp whose purpose is to weld flanges to pipes with the clamp holding the flange plate secure when his jaw members engage the inner diameter of the pipe. The driving means is a crank with a screw having oppositely arranged threads with followers connected to the jaws through links for driving the jaws in opposite directions as the screw is rotated.

Accordingly it is an object of this invention to provide a simple and inexpensive self centering laser guide for laying pipe.

Another object of the invention is to provide a mechanical self centering device that is readily adapted for pipe that is six inches diameter or less.

Still another object of this invention is to provide a pipe axis laser guide that is accurate and does not depend on mere observation to determine the pipe axis.

A further object of the invention is to adapt the self centering lasering guide for installing and aligning independent structures such as pillow blocks for the installation of shaft bearings.

An additional object of this invention is to mount a saddle assembly with an inclination gauge about the circumference of the pipe to measure pipe inclination.

SUMMARY OF THE INVENTION

The self centering laser guide of this invention is a mechanical device based on the principle that when three planar surfaces spaced 120 degrees apart intercept the walls of a cylinder the axis of the cylinder will be automatically determined. The saddle of this invention is a device based on the principle that a series of rectangular members tangent to a cylinder throughout their length are parallel to the cylinder axis.

The self centering pipe axis laser guide assembly comprises three expanding link mechanisms spaced 120 degrees apart having a common base whose center line represents the central longitudinal axis. The links are made up of parallel, radial, lever and axis links. A laser module attached to the base has its output aligned with this base axis. A lead screw is included in the base and is the drive mechanism for a spider lever and the lever links which rotate the radial links and offset the parallel link from the axis link. The relative position of the spider lever is used as an indication of pipe diameter against scales calibrated for both inside and outside diameters. A knob assembly possessing adjustable torque characteristics is connected to the lead screw and is rotated clockwise to expand the links or counterclockwise to retract the links. In either case rotation is continued until excessive torque disengages the lead screw. The pipe axis laser guide has the capability of locating the central axis in a variety of pipe diameters, although it is primarily used for diameters of two to seven inches. Generally the pipe axis laser guide is inserted into the front end of a pipe in the retracted position and expanded until the parallel link edges contact the inside diameter of the pipe. Slight pressure from the parallel links retain the unit in place with the centerline of the base in alignment with the axis of the pipe. Unlike most current laser systems that position the laser beam to specific grade and then manually position the pipe axis to the beam, the laser guide of this device inherently positions the laser beam to the pipe axis and then the pipe is positioned to a specific grade if required with the aid of the saddle and inclination gauge. The pipe axis laser guide in its fully retracted form also possesses the ability to allow the laser beam to project a reference line offset from a flat surface but parallel to that surface.

The saddle assembly is comprised of a series of evenly spaced rectangular struts on a flexible base that is strapped around the outside circumference of the pipe. The straps are adjusted until the rectangular struts are parallel to the pipe axis by positioning the struts tangent to the pipe surface as viewed on each end. A saddle plate is mounted to the center strut and is the reference surface for the inclination gauge. The saddle plate has scribe marks parallel to the central strut and the pipe axis. These marks are used to visibly align the inclination gauge. The inclination gauge may be a variety of presently available commercial products. A bubble vial is mounted to the saddle plate perpendicular to the center strut axis to aid in the positioning of the saddle plate vertically above the pipe axis and eliminating a roll error for proper inclination reading.

While the unit described above has been successful in its main purpose of providing a simple method of locating a pipe axis and for projection of a laser beam on this axis for alignment purposes, it is not without its shortcomings. For one the linkages are designed for pipes 6 inches in diameter or less, while there is an increasing need for its adaptability for larger pipes. Secondly it was discovered that on rotation of the lead screw for expansion of the linkages from a fully retracted position, the rear radial link and the lever link were in a dead spot position. This problem could be resolved by one of several methods, such as reaching into the pipe and manually raising the aforesaid linkage to a slight extent by the use of knockouts, radial springs or ball plungers. However, because of the threaded surface of the lead screw, the procedure had to be repeated if the manual method of raising was used since further binding of the spider lever occurred. The use of a lead screw also interfered with a straight through wiring of the batteries and the laser module and the removal of the knurled knob to replace the batteries and/or the laser module was somewhat laborious. The removal of the laser guide proved to be a problem in some situations, such as working from an inaccessible end of a pipe. Finally the machining required to make a lead screw proved to be time consuming as well as expensive.

It was therefore an object of this invention to correct some of these difficulties by redesigning the placement of the linkages, eliminating the lead screw to control expansion and retraction, simplifying the wiring of the batteries to the laser module, replacing the knurled knob with a switch assembly and providing a mechanism at the front end of the device for removal of the laser guide.

In the modified unit of this invention the linkage remains essentially the same, except for the elimination of the axis links. In lieu of the lead screw in the base as the drive mechanism for the spider lever and lever links the lead screw is replaced by a smooth rigid pipe on which the forward and rear axis spider elements are assembled. Such pipe facilitates placement of the batteries, the laser module and wiring therefore. A switch assembly at the rear end of the pipe allows for easy replacement of the batteries. The spider lever is now associated with a spring base spider element and the spider lever contains a thumbscrew for locking the lever in place once the desired diameter for the linkage is determined. The spring base spider element is the controlling mechanism for enabling flexing and expanding of the linkages. The spring attached to the spider element pushes the associated spider lever for expansion. Additionally with the spider lever unlocked, the spring allows for flexing of the expanded linkages in the event of obstructions in the pipe as the laser guide traverses through the pipe. Stabilizer rods between the associated spiders retain the relative position of the spiders and negate any torque which may be caused by the compressed spring. A loop at the front end of the laser guide enables attachment of a tether line for quick removal of the guide from its pipe. Replacement of the lead screw with a smooth pipe, besides being more economical, permits increasing the linkage lengths as well as the length of the pipe so that the laser guide can be adapted to pipes of greater diameter than 6 inches. Placement of the leveling devices within the front and rear axis spider elements also eliminates the need for a saddle assembly on the top of the pipe, except in some situations where the view is obstructed.

DETAILED DESCRIPTION OF THE INVENTION

Figure 1:
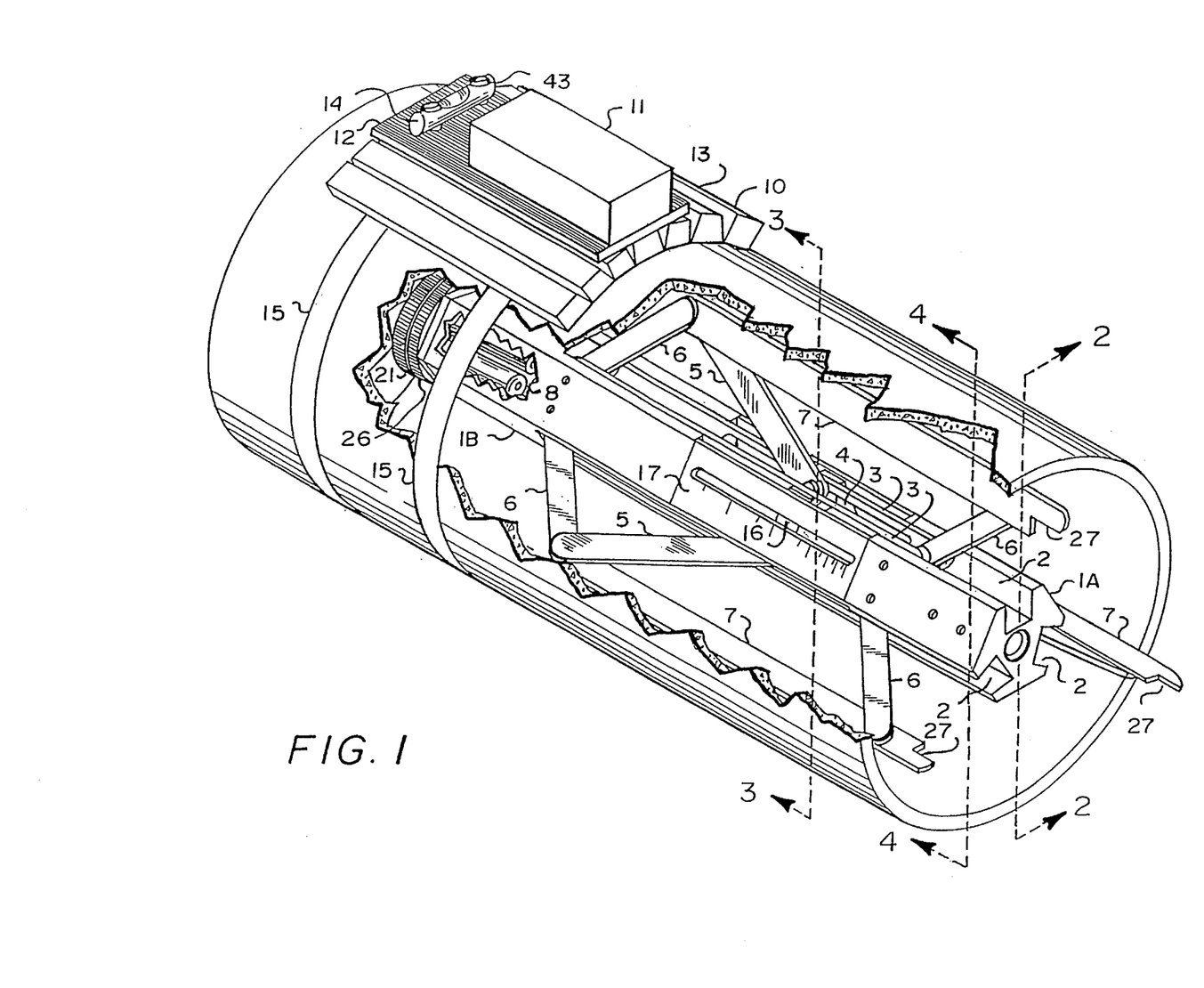
FIG. 1 is an isometric view of the pipe axis laser guide inserted into a section of pipe with the saddle and inclination gauge attached.
Figure 2:
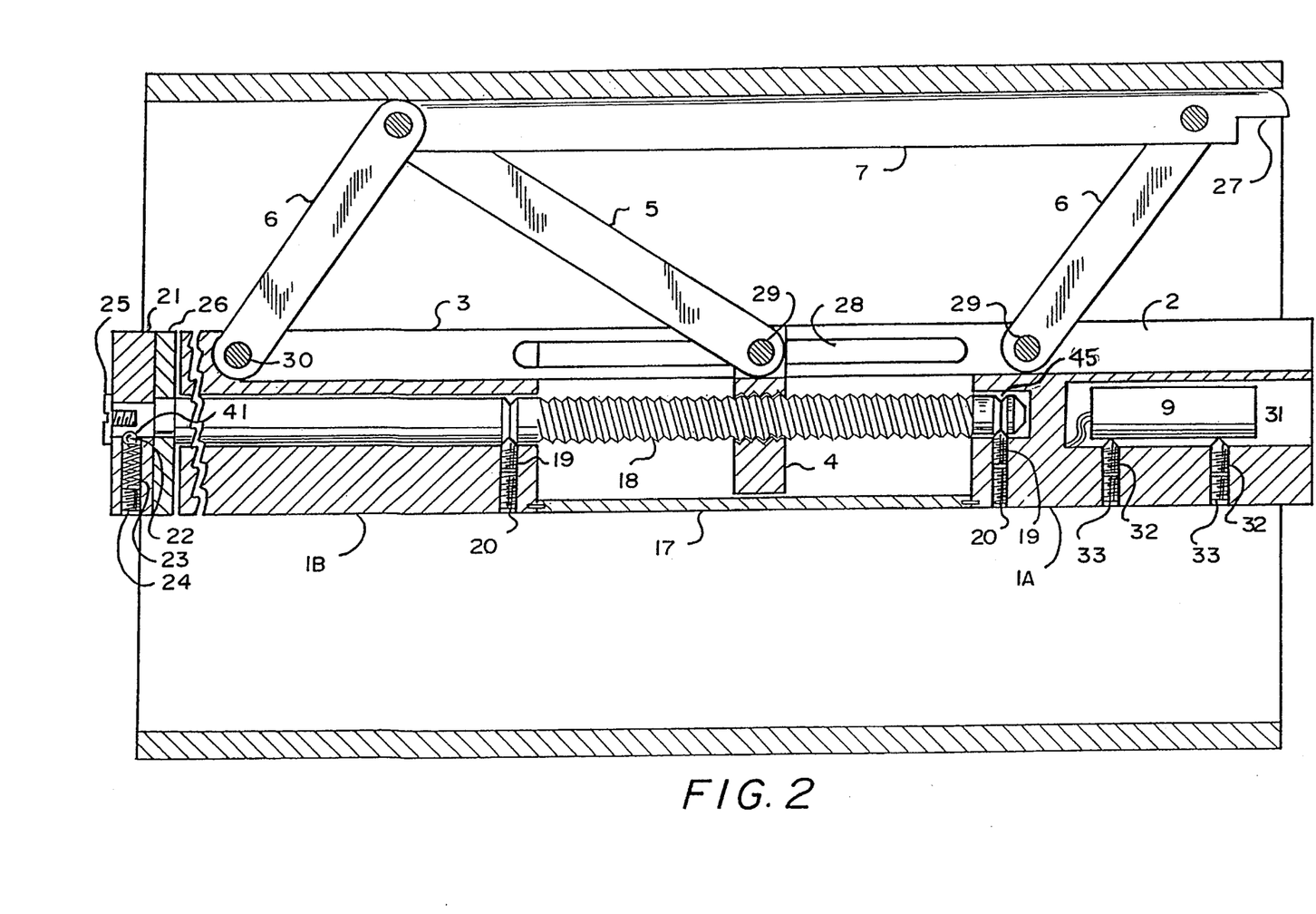
FIG. 2 is a cross sectional view taken on line 2—2 of FIG. 1 of the pipe axis laser guide in its expanded form in a section of pipe.
Figure 4:
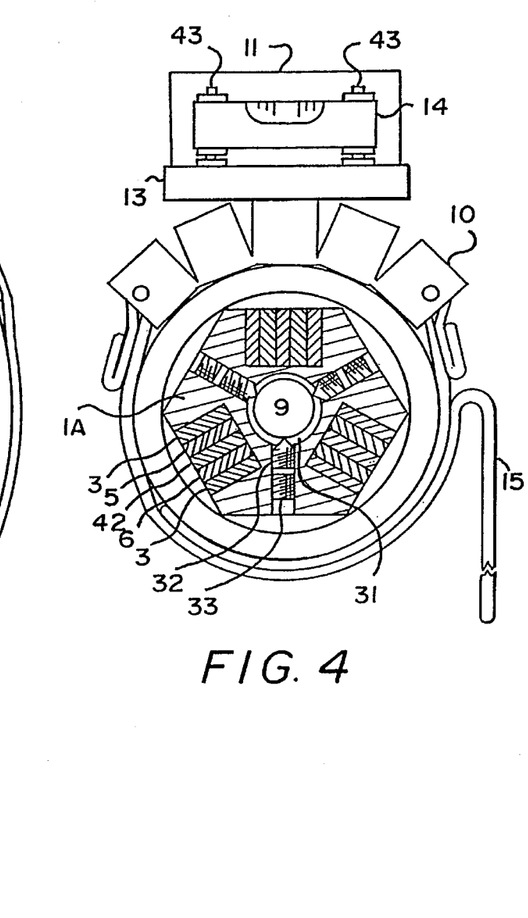
FIG. 4 is a cross sectional view of the pipe axis laser guide taken along line 4—4 of FIG. 1. This view is modified to exhibit its characteristics in a fully contracted position within a smaller section of pipe along with an end view of the mounted saddle and inclination gauge.
Figure 5:
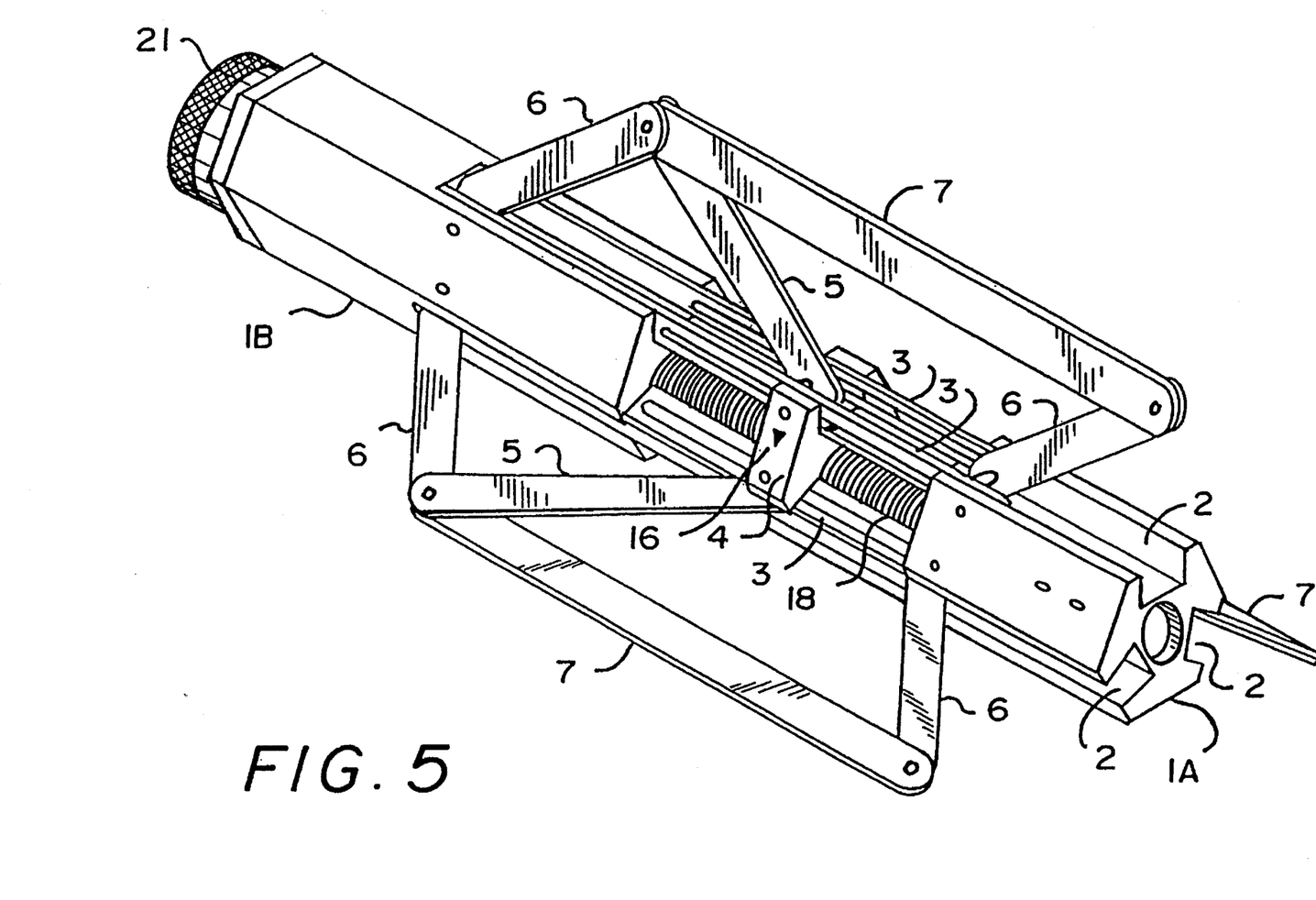
FIG. 5 is an isometric view of the pipe axis laser guide with the side panels removed displaying the lead screw and lever spider with scale pointer.

FIG. 1 shows the pipe axis laser guide installed in a section of pipe with the saddle and inclination gauge attached. The housing 1 comprises a front end spider shaped element 1a and a rear end spider shaped element 1b. These elements are formed from hexagonal stock with three machined channels 2 spaced 120 degrees apart. The channels of the rear end spider element 1b are machined only partially along the axis leaving the hexagonal stock shape which is cored for the insertion of power cell batteries 8 as shown in the cut away section. The batteries connect to the laser module located in the front end spider shaped element and are preferably AA size Ni-Cad batteries. Adjacent the legs of each channel are a pair of axis links 3. Between the rear front and rear end spider elements is a spider lever 4. The spider lever is shaped similar to the rear end spider element but has a short length and a smaller cross section. (See FIG. 3) The axis links 3 are enclosed by the spider lever 4 and align the front and rear end spider elements 1a and 1b. A lever link 5 is connected between spider lever 4, rear radial link 6 and the rear of the parallel link 7. The front of the parallel link is connected to a front radial link 6. The other end of the front radial link is connected to the front end spider element 1a and the rear radial link is connected to the rear end spider element 1b. The position of the spider lever pointer 16 (better seen in FIG. 5) indicates on the side cover plate 17 the scales for the diameter of the pipe under test. The scale is calibrated for inside diameter or outside diameter readings or both. As seen in FIGS. 2 and 4, the front end spider element contains a visible diode laser module 9 which is calibrated to the housing axis. The saddle assembly 10 is the reference surface for the inclination gauge 11. Positioning of the inclination gauge is assisted with the presence of longitudinal lines 12 scribed on the saddle plate 13. Also on the saddle plate is a bubble vial 14 secured by bolts 43. The bubble vial indicates the amount of roll of the saddle plate on the pipe surface. The saddle assembly is secured in place with the use of two longitudinally spaced straps 15.

FIG. 2 shows a cross section of the pipe axis laser guide in a section of pipe. The lead screw 18 is centered in rear spider element 1b and partially in the front spider element 1a. The lead screw is retained in this position by a plurality of radially spaced cone point hex screws 19 backed up by additional hex screws 20. The cones extend into a grooved area 45 located in the lead screw. The adjustment of these hex screws allows rotation of the lead screw while preventing axial movement. Mounted on the rear of the lead screw 18 is a knurled knob 21 which has ball 22 and spring 23 detent mechanism which is adjusted for tension by hex screw 24. While turning the knurled knob with the detent ball seated in a dimple 41 in the lead screw shaft, the lever spider advances or retracts until sufficient torque is exerted to disengage the detent disconnecting the knurled knob from the lead screw. A pan head screw 25 retains the knurled knob position over the shaft. A release knob 26 is keyed to the lead screw in order to expand or retract the unit after the knurled knob has disengaged. While the foregoing description has specifically described the detent mechanism, it will be appreciated that other available methods may be employed in order to prevent excessive torque causing distortion of the linkages mentioned above.

The spider lever meshes with the lead screw and is advanced or retracted positioning the lever link, radial links and the parallel link until contact is made with the inside diameter of the pipe. The parallel link is constructed with a notch 27 for placement on the outside circumference of the pipe when measuring outside diameters as noted in FIGS. 1 & 2. The axis link contains a slot 28 to allow access for joining the lever link to the spider lever with a shoulder screw 29. Another shoulder screw is used to secure the forward radial link and forward part of the axis link to the forward spider element. The rear radial link and the rear of the axis link is connected to the rear spider element with rolled pin 30. As seen in FIG. 4 spacers 42 are used to maintain proper alignment of links on the roll pin and shoulder screws as necessary.

The commercially available visible laser diode module such as the model VLM 2-10 RL manufactured by Applied Laser Systems is located in a bore 31 at the front end spider element and aligned to the housing axis with nine cone point hex screws 32 backed up by additional hex screws 33. While the foregoing description has specifically described the laser module, it will be appreciated that other available models may be employed for specific beam output characteristics and cost considerations.

Figure 3:
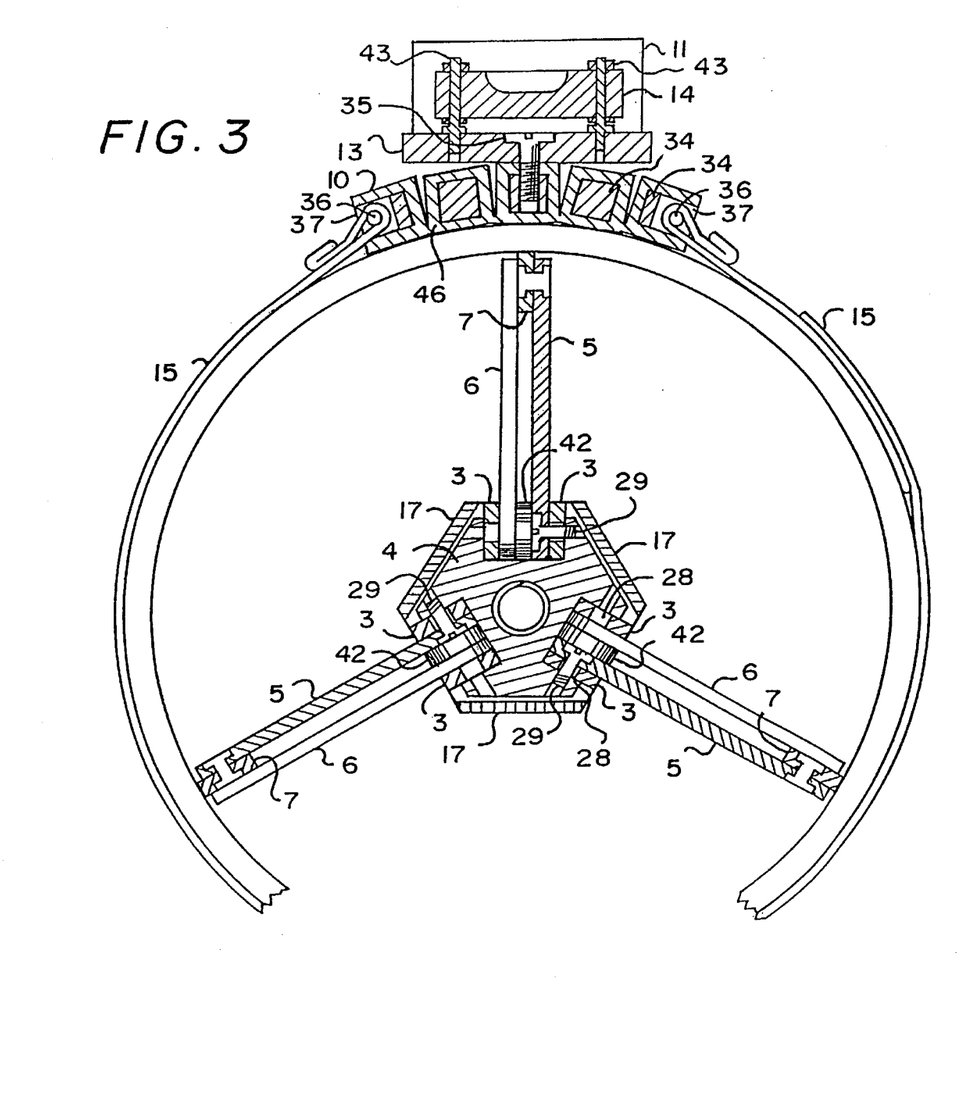
FIG. 3 is a cross sectional view of the pipe axis laser guide within a large section of pipe taken along line 3—3 of FIG. 1 including a cross sectional view of the saddle apparatus.

FIG. 3 shows the saddle assembly comprised of a number of rectangular struts 34 of rigid construction within a molded flexible base 46 made preferably of rubber. This construction allows the saddle to conform to various pipe circumferences while aligning the struts parallel to the pipe axis. The saddle plate is attached to the center strut by screws 35. The length of the struts and saddle plate may vary depending upon the type and style of inclination gauge used. The inclination gauge is not a permanent fixture and is applied in the field visibly aligned with the scribe marks when checking pipe inclination. The saddle plate may also be used as a reference surface for the fully retracted pipe axis laser guide when access to the pipe interior is obstructed and over the top methods of alignment are employed. The end struts possess pins 36 recessed in a biscuit like member 37 for retention of straps which may be characterized as of the hook and loop style. The bubble vial may be installed by conventional methods and calibrated to the saddle plate. The saddle assembly is positioned for an indication of zero roll prior to observing the inclination gauge reading.

Figure 6:
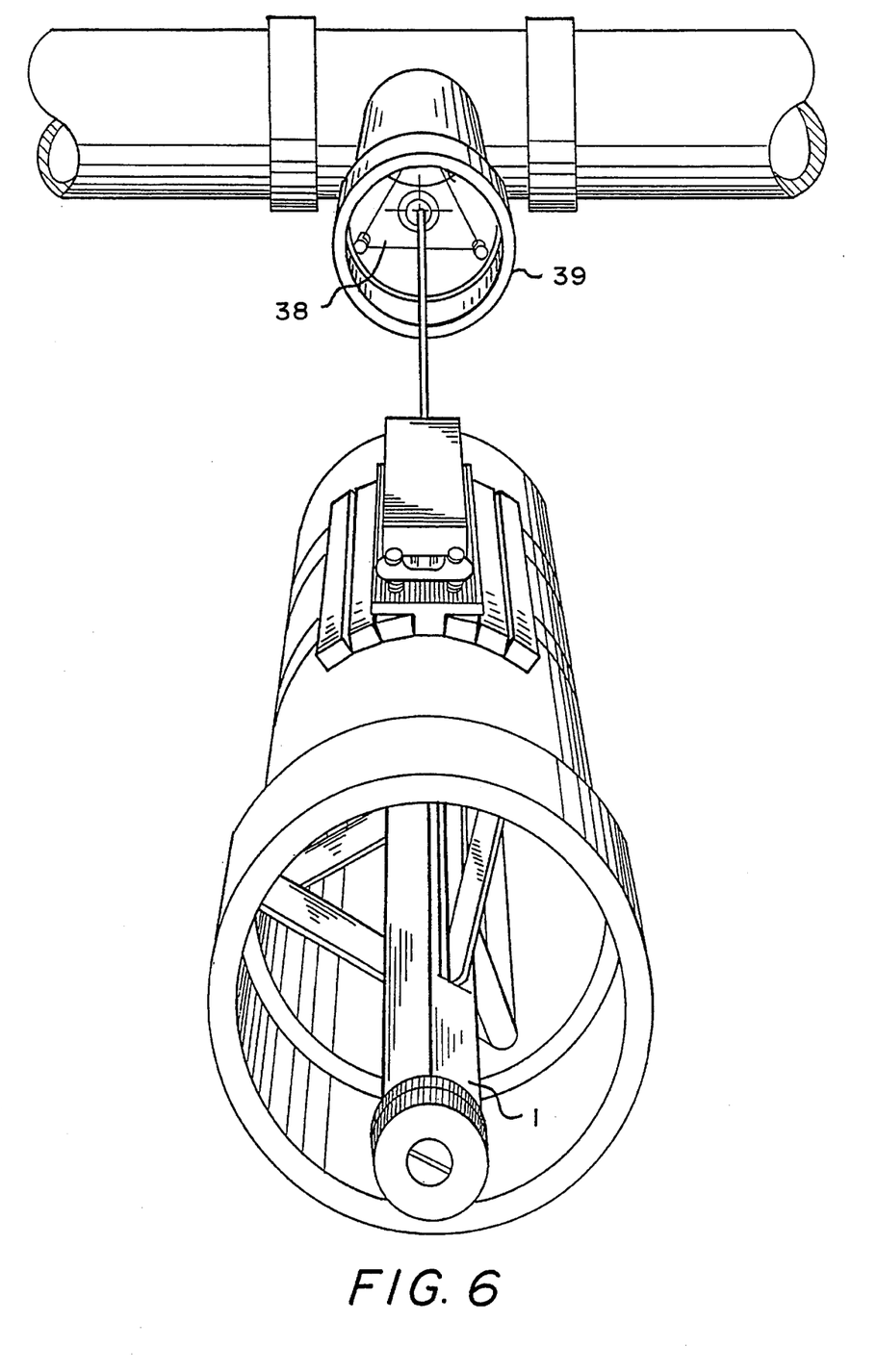
FIG. 6 is a perspective view showing the pipe axis laser installed in a section of pipe with the saddle and inclination gauge attached projecting the laser output towards a standard target assembly in a future connection.

After alignment of the laser beam with the axis of the pipe, the pipe is positioned towards the target assembly 38 installed in the distant pipe coupling 39 as seen in FIG. 6. The inclination gauge reading mounted on the properly aligned saddle plate is monitored for required grade and the elevation and horizontal position of either the coupling or the pipe is adjusted accordingly for alignment. At this point additional pipe connections can be installed by aligning their axes with the reference laser beam using the standard pipe target.

Figure 7:
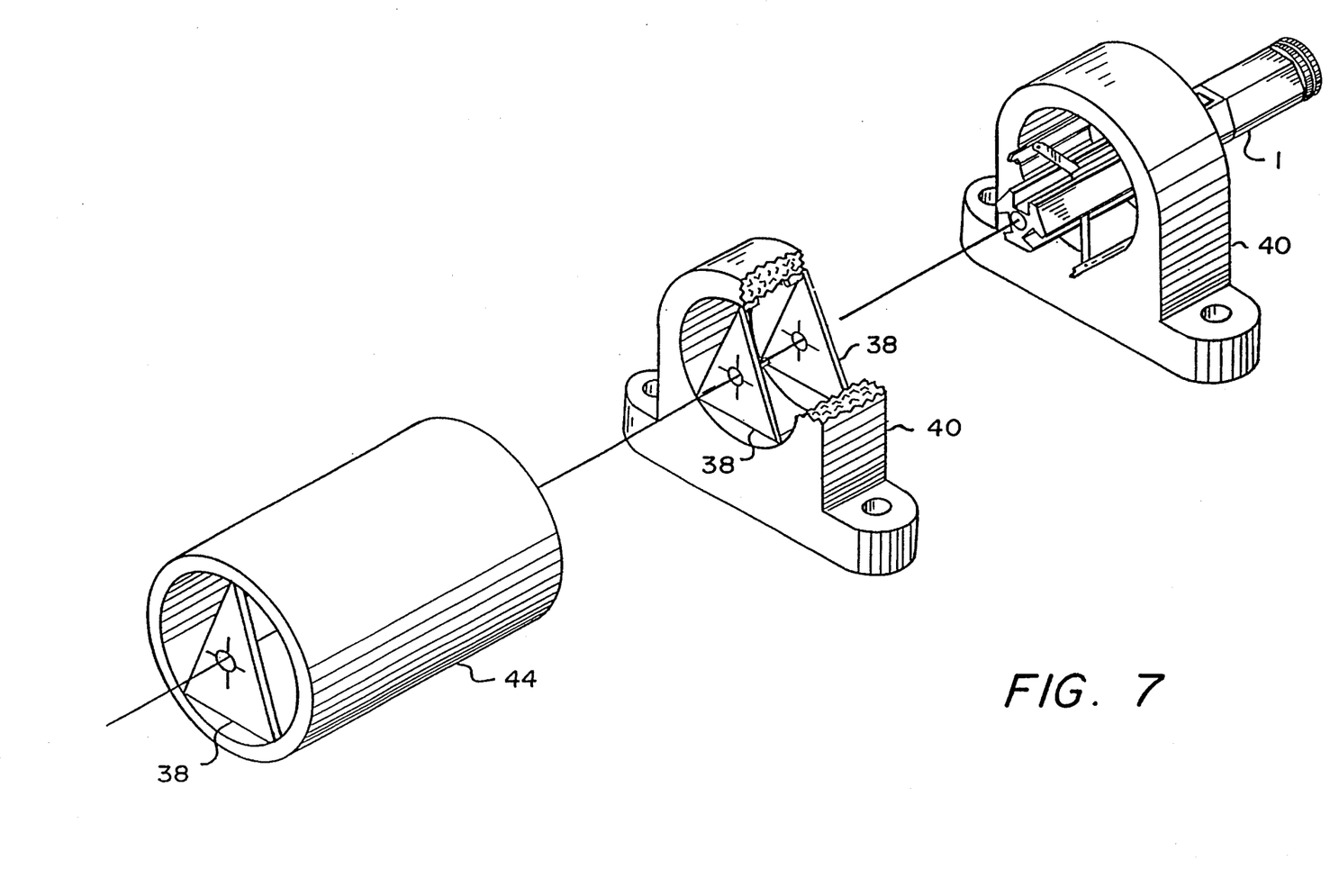
FIG. 7 is an isometric view of the pipe axis laser guide installed in a pillow block with its laser output projected through two target assemblies installed in a second pillow block for alignment of concentricity. A pipe section which may represent a motor shaft is also displayed.

FIG. 7 illustrates the versatility of the pipe axis laser guide by showing the apparatus installed in a pillow block 40 for a drive shaft bearing not shown. The position of the pillow block for the purposes of discussion may be installed on a large piece of driven machinery and a drive shaft and prime mover are to be aligned to this machinery. Independent pillow blocks are aligned to the driven machinery on all axes with the use of two target assemblies which allow the beam to pass through the target when centered thereon. A section of pipe 44 with targets 38 installed therein may be placed over the prime mover's drive shaft to aid in alignment of the independent prime mover in a like manner.

Figure 8:
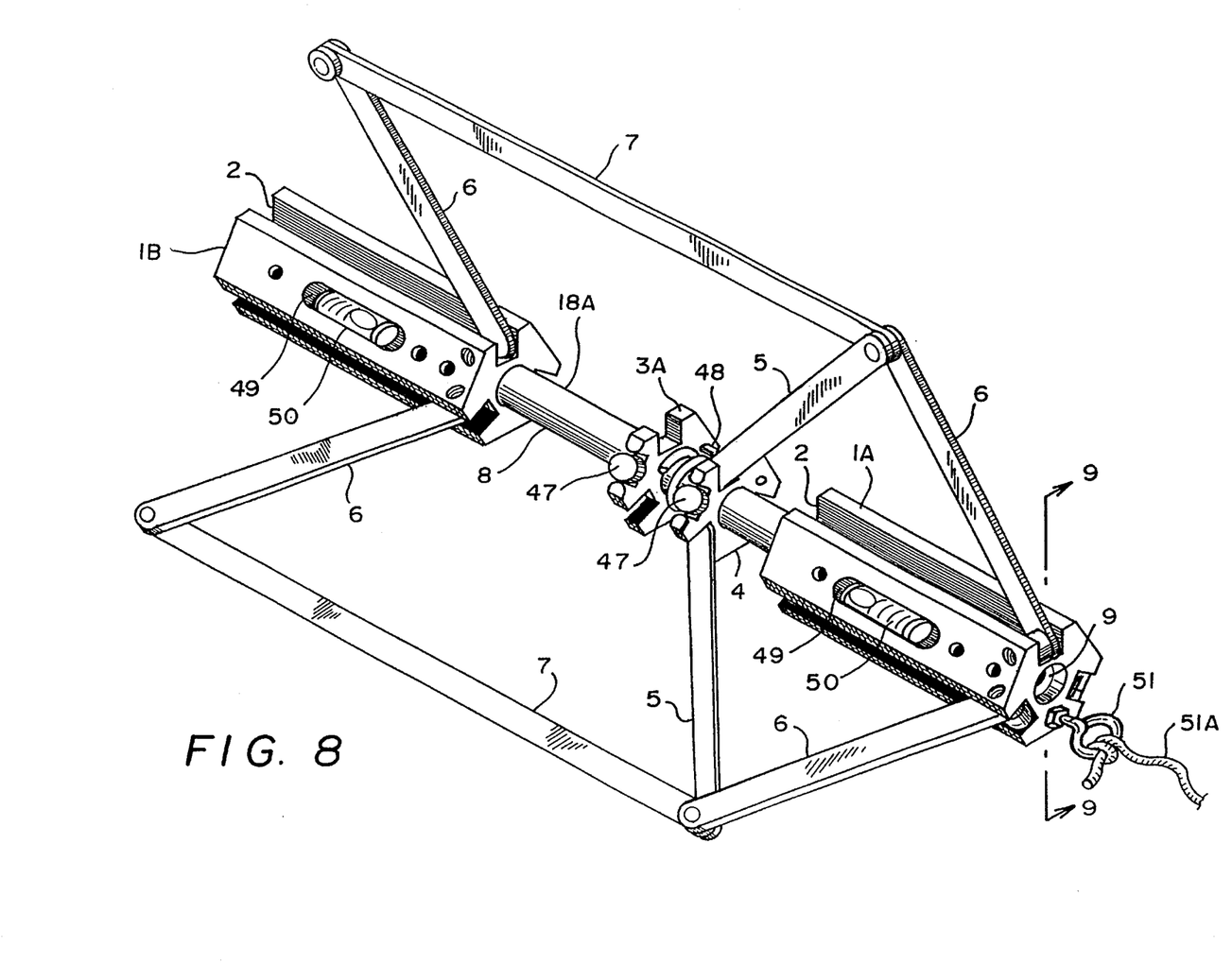
FIG. 8 is an isometric view drawing of the modified pipe axis laser guide.

FIG. 8 is an isometric view of the modified axis laser guide. The pipe axis laser guide comprises a front end spider element 1a and a rear end spider element 1b. These elements like those of my earlier application are identically machined from hexagonal stock with 3 machined channels 2 spaced 120 degrees apart. Located between the front and rear spider element is a spring base spider element 3a and a spider lever element 4. A spring 3b is attached to spider element 3a and is positioned between the spring base spider and the spider lever. These spider elements have a uniform bore to accept a smooth pipe 18a that houses a laser module 9 and power supply subassembly 8. The pipe housing is the focal point for alignment of the front and rear end spider elements and functions as a base for the spider lever element and the spring base spider element, the latter being slidable on the base. The spider lever is locked in the desired position along the housing with a thumbscrew 47 as is the spring base spider element with a corresponding thumbscrew 47. Preferably these thumbscrews are made of nylon as will presently be explained. When the spider lever's thumbscrew is released, the spider lever's position depends on the amount of compression in the spring. Two stabilizer rods 48 extending between the spider lever and the spring base spider maintain their alignment and prevent any torquing that may result from the spring in compression. Attached to the front end spider element are three forward radial links 6 and attached to the rear end spider element are three rear radial links 6. The forward and rear radial links are at each end of the three parallel links 7. Three lever links 5 connect the spider lever with the forward radial links and the parallel links. The forward spider element as well as the rear spider element contain oval slots 49 for placement of graduated level vial assemblies 50. The level in the forward element is aligned to indicate positive grade or slope and the level in the rear element is similarly aligned to indicate negative grade or slope. In general level readings are taken directly when the axis lever guide is directly within the pipe or as will be discussed below when the axis lever guide is cradled over the pipe. There are occasions when readings within the pipe are difficult because of the location of the pipe or the position of the axis laser guide within a very long pipe. In these situations it is convenient to adapt a conventional remote level sensing instrument wherein the necessary detection circuit selectively lights indicator lamps which are arranged in a display panel that establishes the orientation of the inaccessible spirit level, that is, whether it is correct or out of level. Alternatively, there might be a plurality of pairs of concentrated light sources and detectors arranged along the length of the level indicator wherein a digital circuit converts the detected outputs into a direct digital display or into a format useful for other digital data handling equipment. An eyebolt 51 is threadably attached below the bore of the front spider element. If and when it becomes necessary to remove the laser axis pipe guide from a pipe, a tether line 51a attached to the loop of the eyebolt, facilitates swift removal. At the same time with the thumbscrew of the lever link unlocked, in the event of any obstructions in the pipe, the linkages will be able to flex so that any obstruction will be readily traversed.

Figure 9:
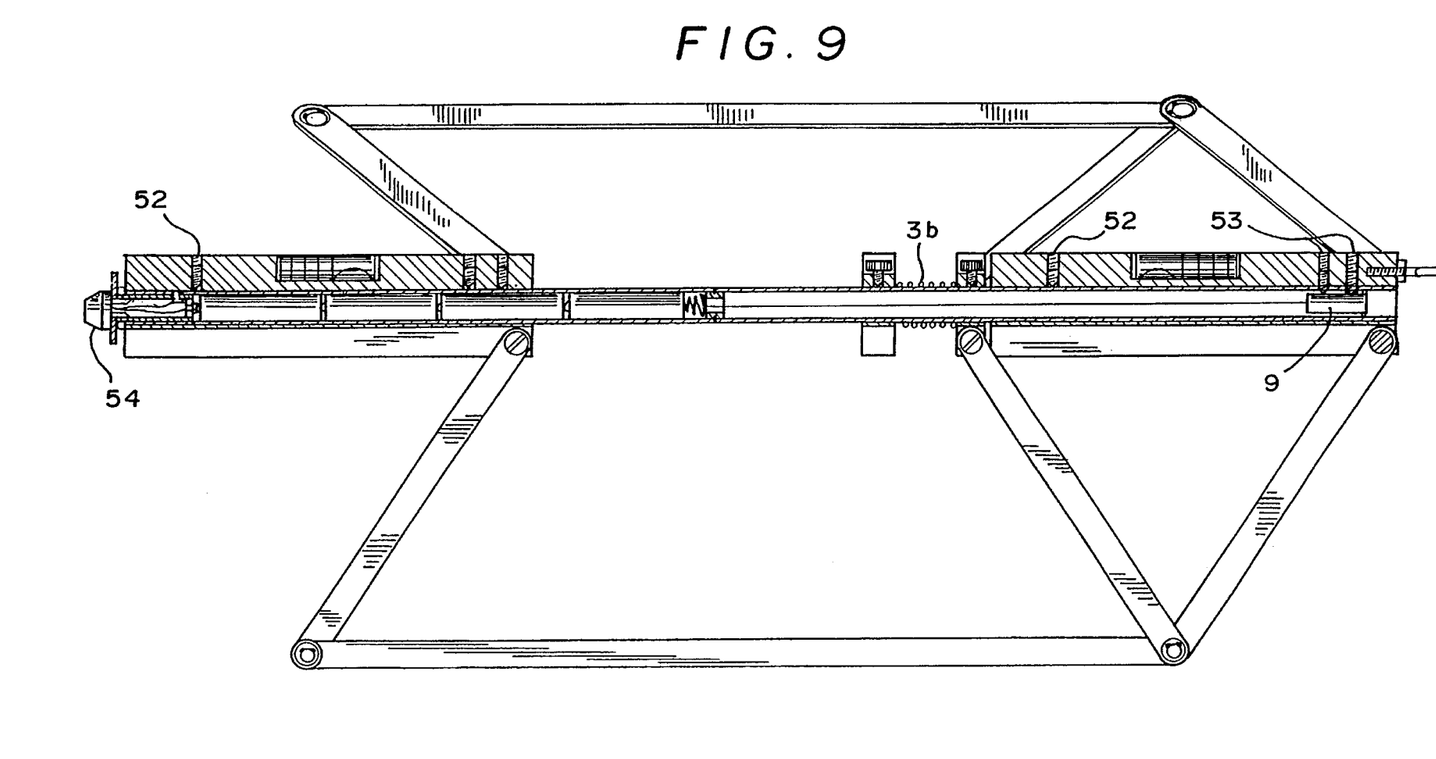
FIG. 9 is a front cross section taken on line 9—9 of FIG. 8 showing the laser guide in its expanded form.

FIG. 9 is a front sectional view that shows the front spider element and the rear spider element attached to the pipe housing by a plurality of set screws 52. The laser module 9 is aligned with a plurality of set screws 53 which penetrate the pipe housing. At the rear of the rear spider element a switch assembly 54 is provided to apply power to the laser module.

Figure 10:
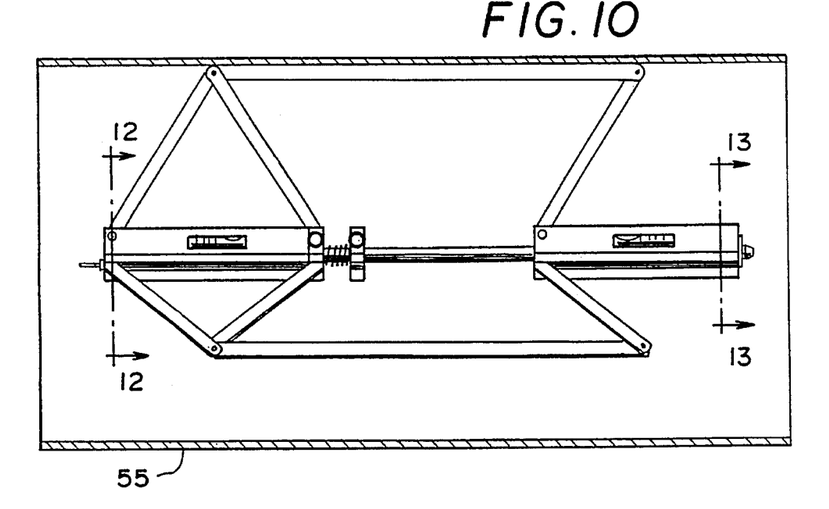
FIG. 10 is a front view of the laser guide fully extended in a 12" pipe.
Figure 11:
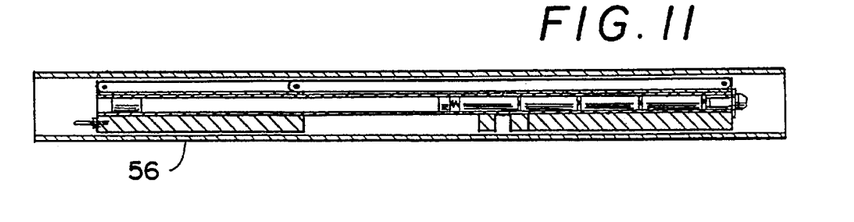
FIG. 11 is a front view of the laser guide in a 2" pipe fully retracted.

FIG. 10 is a front sectional view showing the axis laser guide in its fully expanded form in a 12" pipe 55 and FIG. 11 is a front sectional view of the axis laser guide in a 2" pipe 56 in fully retracted form.

Figure 12:
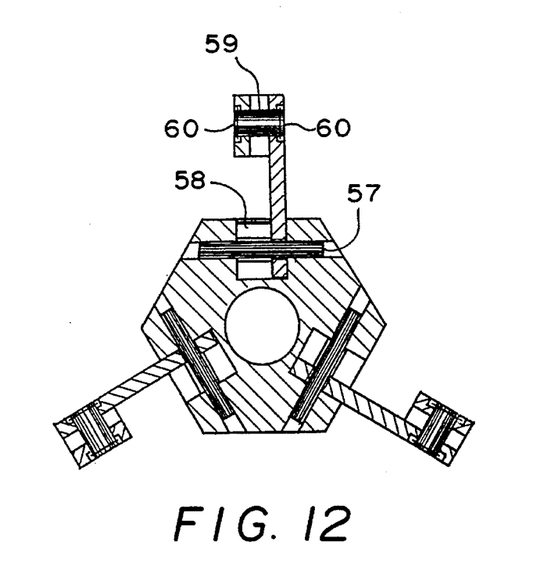
FIG. 12 is a side cross sectional view taken on line 12—12 of FIG. 10.

FIG. 12 is a cross sectional end view showing the front spider element attached to the radial link with a roll pin 57. A spacer 58 is provided in the machined channels to maintain alignment of the radial link. The lever link, parallel link and forward radial link are attached by a shaft 59 and C rings 60. A similar arrangement is obtained in the rear except that there is a spacer in place of the lever link.

Figure 13:
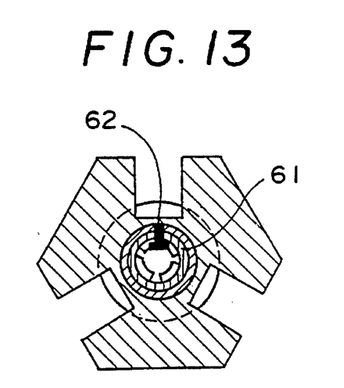
FIG. 13 is a side cross sectional view taken on line 13—13 of FIG. 10.

FIG. 13 is a cross sectional end view showing the rear spider element with the switch assembly which consists of a pipe section 61 slidable within the pipe housing and a rivet 62 which retains the switch assembly in parallel and coincident relationship with the power supply subassembly and laser module.

Figure 14:
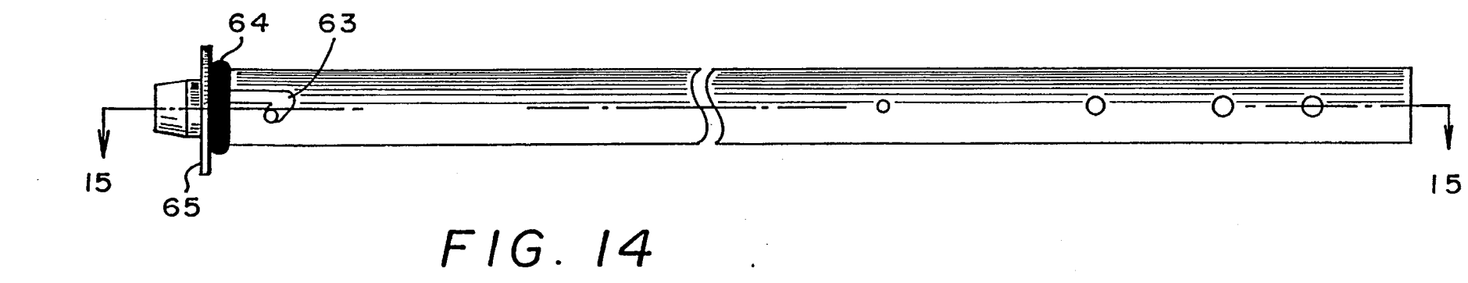
FIG. 14 is a plan view of the laser module and power supply subassembly.

FIG. 14 is a front view of the pipe housing which is made of electrically conductive material. The rivet retains the switch assembly in a J shaped groove 63. An O-ring 64 situated between the groove and a washer 65 maintains the switch assembly in a waterproof condition when compressed between the washer and the pipe housing.

Figure 15:
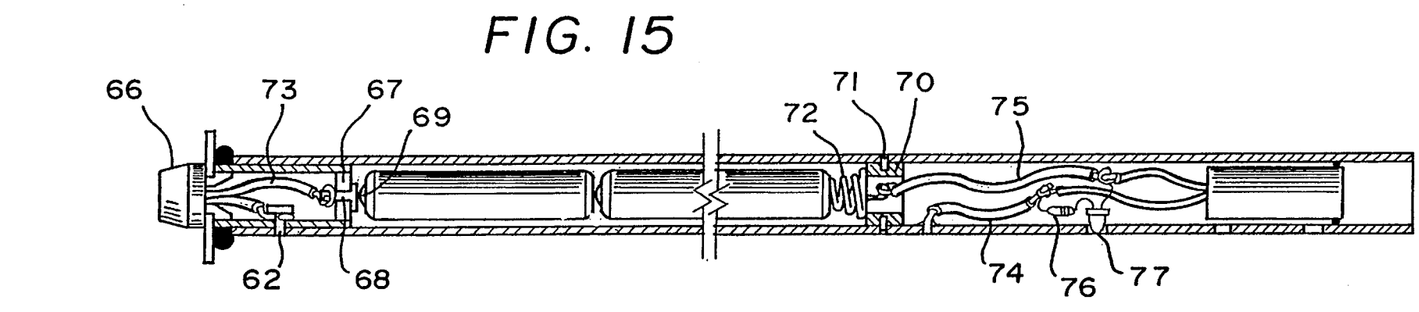
FIG. 15 is a cross section taken on line 15—15 of FIG. 14.

FIG. 15 is a cross section of the pipe housing showing a switch 66 connected to the washer 65, which is soldered to the pipe section. The forward part of the pipe section, that is the part closest to the front, has an insulated spacer 67 with a conductive rivet 68 passing through its center that serves as a contact for the positive terminal of the batteries 69. Another insulated spacer 70 retained by spring pins 71 emanating from the pipe housing buttresses a spring 72 which serves as a contact for the negative terminal of the batteries and pushes the batteries rearwardly to retain the switch assembly rivet 62 in its J groove. When the switch is in the On position, current flows from the positive terminal of the battery through rivet 68 and its attached wire 73 through the switch, rivet 62, the conductive pipe housing, wire 74 which is soldered to the pipe housing, and to the laser module. A ground wire 75 extends between the laser module and the spring. A resistor 76 and light emitting diode 77 are connected in series through wires 78 and 79, wherein the diode is an indicator of laser emission.

Figure 16:
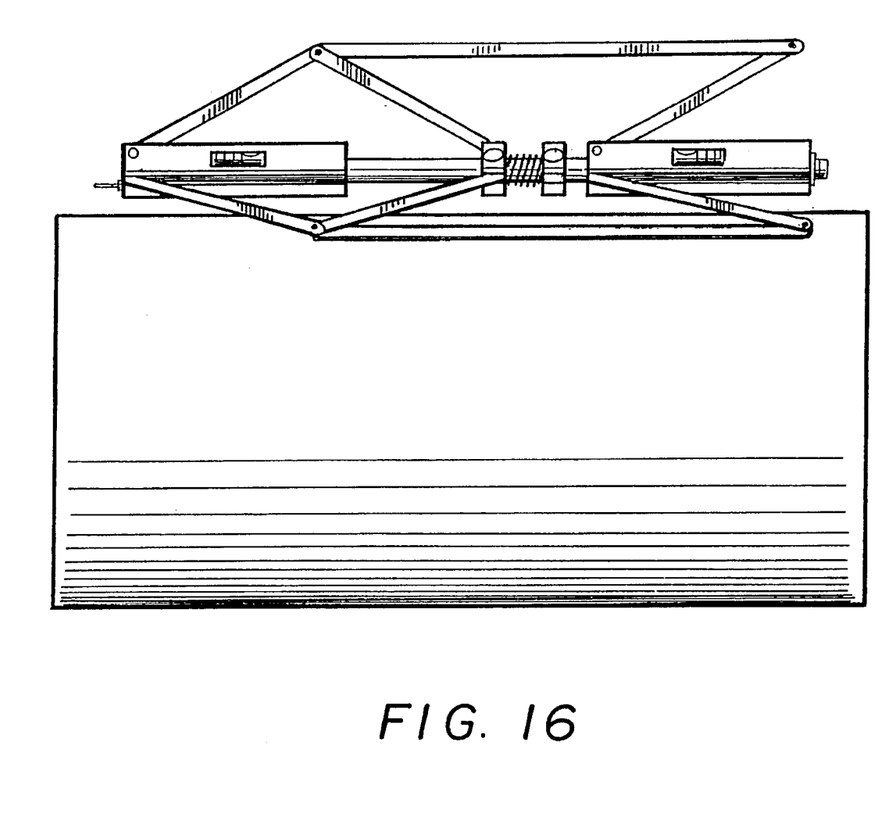
FIG. 16 is a front view of laser guide on top of a pipe.
Figure 17:
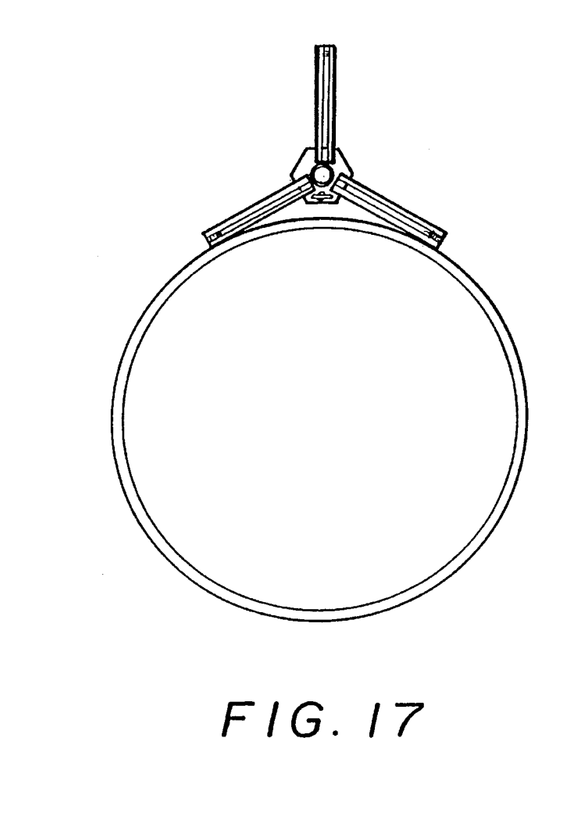
FIG. 17 is an end view of the same.

FIG. 16 is a front view showing the laser guide on the top of the pipe and FIG. 17 is an end view of the same. Occasionally it is desirable to cradle the laser guide on the top of a pipe section, for example, when it proves too difficult to take level readings within the pipe or if the line of sight becomes obstructed. In placing the laser guide on the top of the pipe, the extended legs will cradle the pipe, aligning the device parallel to the pipe axis. The level vials will also indicate the amount of slope of the pipe axis. The laser beam may also be utilized with a target assembly in an offset position.

While the improved laser guide has been described for use with a pipe, it should be understood it could just as well be adapted to any apparatus or device that requires accurate location of an axis for alignment purposes such as the pillow block shown in FIG. 7.

In operation of the self centering laser guide the procedure would be as follows:

Starting with the laser guide in its fully retracted position the device is set to the approximate pipe size as shown below:

1. Release the spider lever thumbscrew.
2. Release the spring base spider element thumbscrew.
3. Manually withdraw the three parallel links from the machined channels. (note that once the dead spot is overcome, the spring fully extends, resulting in partial extension of the unit and unlike the situation in my prior application, there will be no further binding).
4a. For setting the device without using its flex capability, insert the device in the pipe whose axis is to be determined, move the spider lever element forwardly along the pipe housing of the laser module and power supply subassembly until contact is made with the pipe interior by all three parallel links and lock the device in place with the spider lever thumbscrew.
4b. For setting the device with flex capability, follow the same steps as in 4a above except that after contact is first made with the pipe interior by the parallel links, withdraw the device from the pipe interior and allow the unit to expand until the outer diameter of the unit is slightly larger than that of the pipe inside diameter. Reinsert the unit in the pipe and lock the spring base spider element thumbscrew. The significance of using nylon thumbscrews is that in the event there is insufficient flexing, by applying sufficient pressure against the locked thumbscrew, the spring base spider element will move forward without scoring the pipe housing and allowing additional flexing.
5. Attach a tether line to the eyebolt if required and toss the tether line's free end through the pipe. (Note that removal of the device with the tether line requires that the flex capability be utilized).

6. After insertion of the laser guide into the pipe and the guide has been expanded as required, verify a firm fit.
7. Position the pipe for proper grade or slope as indicated on either of the graduated level vial assemblies either by direct reading or remote control.
8. Secure the pipe.
9. Apply power to the laser module by rotating the switch clockwise.
10. Continue to pass the tether line through additional connecting pipe sections and align those pipe sections using the laser output and a standard pipe target assembly.
11. Remove the self centering laser guide by pulling the tether line.
12. Disconnect power by turning the switch counterclockwise.
13. Release any locked thumbscrews and compress the linkages simultaneously into their retracted and stowed position.

For Battery Replacement:
1. Push and rotate counterclockwise the washer and then remove the switch assembly from the unit
2. Slightly elevate the laser guide to allow the batteries to slide out of the unit
3. Insert new batteries with the negative terminals going in first.
4. Align rivet 62 on the switch assembly with the "J" groove. Push and rotate the washer clockwise until engaged.

The subject matter of this invention has been described, but it should be obvious to those skilled in the art that many modifications, substitutions or variations of the invention are possible in light of the above teachings. It is therefore to be understood that within the scope of the appended claims the invention may be practiced otherwise than specifically described.

I claim:

1. A self centering pipe or pillow block axis laser guide for a pipe or pillow block having an inside diameter and an outside diameter, comprising an expandable and contractible linkage mechanism that is adapted to be inserted into the interior of said pipe or said pillow block, said linkage including three parallel links having opposite ends and being spaced 120 degrees apart that when expanded can contact the interior the interior of said pipe or pillow block and establish the center axis of said pipe or pillow block, each of said parallel links being connected at each end to radial link, said radial links being inclined in the same direction, each of said parallel links being further connected to an intermediate lever link at a location between said opposite ends, a pipe housing connected to a front end spider element and a rear end spider element, a spider lever element and an associated spring base spider element located between said front and rear end spider elements, each of said elements having a bore that fits over said pipe housing, each of said elements having three machined channels spaced 120 degrees apart, said spider lever element and said associated spring base spider element each having a thumbscrew mounted therein, and a biasing means mounted therebetween, means fastening said lever link to said spider lever, said pipe housing being centrally located with respect to said parallel links, said thumbscrews controlling the movement of said lever link and the contraction or expansion of said parallel links such that when each thumbscrew is released said parallel links can be completely retracted, when said thumbscrew of said spring base spider element is locked and said thumbscrew of said spider lever element is open, said parallel links can be partially expanded or partially contracted, said pipe housing containing a laser module and a power supply subassembly, said laser module being in a front end of said pipe housing and in alignment with said center axis of said pipe or pillow block when said laser guide is inserted into said pipe or pillow block.

2. A self centering laser guide as in claim 1 wherein an eyebolt is fastened to said front spider element at a front end thereof and a tether line is tied to a loop of said eyebolt to facilitate removal of said laser guide from said pipe, and means for setting said laser guide for flex capability to clear any obstructions that may be present in said pipe.

3. A self centering laser guide as in claim 2 where said means for setting for flex capability comprises said parallel links expanded past said inside diameter, said thumbscrew in said spring base spider element being locked and said thumbscrew in said spider lever element being released.

4. a self centering laser guide as in claim 1 wherein said spring base spider element and said spider lever element are maintained in alignment by at least one stabilizer rod extending through a hole in said spring base spider element and said spider lever element, and said front and rear spider elements have legs defining said channels, one of said legs of each of said front and rear spider elements having a slot for housing a graduated level vial assembly, said vial assembly of said front spider element being arranged for measuring positive grade and said vial assembly of said rear spider element being arranged for measuring negative grade.

5. A self centering laser guide as in claim 4 wherein said front and rear end spider elements are fixed to said pipe housing by a plurality of set screws extending through said legs of said channels and said laser module is aligned with a plurality of set screws, said set screw extending through the legs of said channel and through said pipe housing.

6. A self centering laser guide as in claim 4 wherein said laser guide is adapted to be mounted on the top of said pipe such that two of said three parallel links cradle said pipe, said laser guide being thereby aligned parallel and offset to said pipe axis, said level assemblies determining said slopes, said laser guide projecting a beam therefrom.

7. A self centering laser guide as in claim 1 wherein said pipe housing is electrically conductive and has a switch assembly at a rear end thereof, said switch assembly comprising a switch, a slidable pipe section in said pipe housing, a snap-type washer soldered to said pipe section and interposed between said switch and said pipe section, an O-ring for sealing against moisture, overlapping said pipe section and located between said pipe housing and said washer, a first rivet attached to said pipe section and electrically connected to said switch and seated in a J groove running through said pipe housing, a second rivet mounted in an insulated spacer in said pipe section and electrically connected between said switch and a positive terminal of a battery, said battery being held in compression by a spring between a negative terminal of said battery and an insulated spacer fastened to said pipe housing, said positive and negative terminals being electrically connected to said laser module, power being activated when said switch is rotated clockwise, a light emitting diode electrically connected through said conductive pipe housing and to the negative terminal connected to said laser module for emitting light when said laser module is operative.

8. A self centering laser guide as in claim 7 wherein said switch assembly is retained in said J groove by compression of said spring, said washer enabling removal of said switch assembly by being pushed and rotated counterclockwise to disengage said first rivet from said J groove thereby permitting said battery to be removed from said pipe housing upon removal of said switch assembly.

* * * * *